United States Patent [19]

Doddington et al.

[11] Patent Number: 5,146,539
[45] Date of Patent: Sep. 8, 1992

[54] METHOD FOR UTILIZING FORMANT FREQUENCIES IN SPEECH RECOGNITION

[75] Inventors: George R. Doddington, Richardson, Tex.; Yeunung Chen, Chelmsford, Mass.; R. Gary Leonard, Plano, Tex.

[73] Assignee: Texas Instruments Incorporated, Dallas, Tex.

[21] Appl. No.: 270,427

[22] Filed: Nov. 8, 1988

Related U.S. Application Data

[63] Continuation of Ser. No. 676,687, Nov. 30, 1984, abandoned.

[51] Int. Cl.$^5$ ............................................. G10L 9/02
[52] U.S. Cl. ........................................ 395/2; 381/41; 381/50
[58] Field of Search ................... 381/36–39, 381/43, 50

[56] References Cited

U.S. PATENT DOCUMENTS

| | | | |
|---|---|---|---|
| 3,553,372 | 1/1971 | Wright | 381/43 |
| 4,227,177 | 10/1980 | Moshier | 381/45 |
| 4,346,262 | 8/1982 | Willems et al. | 381/50 |
| 4,424,415 | 1/1984 | Lin | 381/50 |
| 4,486,899 | 12/1984 | Fushikida | 381/36 |
| 4,536,886 | 8/1985 | Papamichalis et al. | 381/41 |
| 4,590,605 | 5/1986 | Hataoka et al. | 381/43 |
| 4,625,286 | 11/1986 | Papamichalis et al. | 364/513.5 |

OTHER PUBLICATIONS

"Automatic Extraction of Formant Frequencies from Continuous Speech"–Flanagan, The Journal of the Acoustical Society of America, vol. 28, No. 1, pp. 110–118 (Jan. 1956).
"System for Automatic Formant Analysis of Voiced Speech"–Schafer et al., The Journal of the Acoustical Society of America, vol. 47, No. 2, pp. 634–648 (1970).
"Elements of Numerical Analysis"–Henrici, John Wiley & Sons, pp. 110–115 (1964).
"Linear Prediction of Speech"–Markel et al., Springer-Verlag, pp. 94–95 (1976).
"Introduction to Numerical Methods"–Stark, Macmillan Publishing Co., New York, pp. 85–91 and 96–113 (1970).

*Primary Examiner*—Dale M. Shaw
*Assistant Examiner*—David D. Knepper
*Attorney, Agent, or Firm*—William E. Hiller; Richard L. Donaldson

[57] ABSTRACT

A speech recognizer which utilizes hypothesis testing to determine formant frequencies for use in speech recognition. A pre-processor (36) receives speech signal frames and utilizes linear predictive coding to generate all formant frequency candidates. An optimum formant selector (38) operates with a comparator (40) to select from the formant candidates those formants which best match stored reference formants. A dynamic time warper (42) and high level recognition logic (44) operate to determine whether or not to declare a recognized word.

7 Claims, 2 Drawing Sheets

METHOD FOR UTILIZING FORMANT FREQUENCIES IN SPEECH RECOGNITION

This application is a continuation of application Ser. No. 676,687, filed Nov. 30, 1984, now abandoned.

TECHNICAL FIELD OF THE INVENTION

This invention relates to speech recognition, and more particularly relates to the use of formant frequencies in speech recognition.

THE PRIOR ART

Although substantial strides have been made in speech recognition, adequate speech recognition by machine still remains an elusive goal. Many techniques have been heretofore developed which provide useful recognition of certain aspects of speech, but highly competent and accurate recognition, especially speaker-independent recognition, remains largely unrealized primarily because of the large variability in the statistics of the speech signal. Humans are quite excellent at recognizing speech despite the variations, because human perception is sensitive to the modal frequencies of the speech signal which are, in turn, relatively invariant to distortion, noise, and speaker-to-speaker variation. Current machine techniques, on the other hand, invariably use spectral amplitude as a primary measure upon which speech recognition is based. All such spectral amplitude measures are severely limited in speech recognition due to the factors of distortion, noise and speaker-to-speaker variation.

As the human vocal tract operates similarly to a variable resonator, the speech signal includes modal frequencies which are generally termed formants or formant frequencies by speech scientists. It has long been known in the field of speech science that appropriate measures for speech recognition should include analysis of formant frequencies. However, a prevailing opinion among many scientists is that it is not practical to use the formant frequencies for machine recognition because such formant frequencies are very difficult to determine with adequately high reliability. Consequently, previous attempts to use formant frequencies have often caused inaccuracies in voice recognition.

SUMMARY OF THE INVENTION

In accordance with the present invention, a method and apparatus is provided to select or determine formant frequencies with extremely high reliability, such that formant frequencies may be utilized in accurate speech recognition.

In accordance with the invention, the philosophical approach of "hypothesis" testing is used to enable formant frequencies to be determined for use with speech recognition. The present invention does not attempt to determine formant frequencies in an absolute sense, but concentrates on determining formant frequencies in the context of a recognition hypothesis to be tested.

In further accordance with the invention, a set of formant frequency candidates are determined independent of recognition hypotheses. The formant frequency candidate thus includes all possible choices of formants. For each frame of reference data the optimum choice of formant frequency candidates is determined which best matches the formants of the reference frame. After the appropriate formant candidates are determined, standard decision making techniques are utilized to consummate the speech recognition decisions.

In a more specific aspect of the present invention, all candidate formant frequencies for each frame of data are determined by use of a linear predictive coding polynomial. For each frame of reference data, the optimum choice of formant frequency candidates which best match the formants are determined. In the preferred environment, the formant frequencies are represented in terms of mel frequency and log bandwidth, including the log pitch frequency as a feature, and modeling such data as a multivariate Gaussian random variable. A covariance matrix, estimated from a set of training tokens, is then used in computing the likelihood of the function. An exhaustive evaluation is made of all possible sets of formant frequency candidates, and the set is chosen which maximizes the likelihood of the observed data. After the appropriate formant frequency candidates have been selected, standard time alignment and decision-making techniques are invoked to consummate the particular speech recognition decision. For example, a frame error is computed based upon features such as formant frequencies and bandwidths and dynamic programming is used to determine an optimum time alignment and resulting decision function for the various recognition hypotheses.

BRIEF DESCRIPTION OF THE DRAWINGS

For a more complete description of the present invention and further aspects and advantages thereof, reference is now made to the following drawings in which.

DESCRIPTION OF THE PREFERRED EMBODIMENT

FIGS. 1a-e illustrate spectrograms of five different voices speaking the word "chaff". As is known, spectrograms comprise a plot of the voice frequency versus time, with the intensity of the graph being representative of the amplitude of the speech signal. The maximum frequency plotted on FIGS. 1a-e is approximately 4 kHz the illustrated time scale being approximately 1½ seconds. Because the five spectrograms shown in FIGS. 1a-e result from five different voices, it will be seen that the results are quite different. This is because of the many variations in the shape and size of the human vocal tract which therefore causes each different human to emit different frequency outputs.

The first portion of each of the spectrograms is indicated by an area 10 which represents the enunciation of the letters "ch". Because these letters are unvoiced, that is produced by turbulence and not by vocal cord action, it is difficult to determine formant frequencies therefrom. The portions 12 of the spectrograms comprise the voice sound "a". Because this portion of the word is voiced and is determined by the particular resonator determined by the shape of the speaker's mouth, modal or formant frequencies are produced for each of the spectrograms. The last portions of the spectrograms are indicated generally by the numeral 14 and indicate the pronunciation of the letters "ff", which may be seen not to produce distinct formant frequencies as they are not generally produced by a vocal cord action.

The formant frequencies shown in portion 12 of each of the spectrograms 1a–e contain valuable information which is extremely useful for voice recognition. It may be seen by inspection of FIGS. 1a–e that each of the five spectrograms produces its own "signature" which may be very useful to compare against a stored voice signal to indicate occurrence of a particular voice.

However, in order to utilize the information contained by the formant frequencies, it is necessary to very accurately predict which of the formant frequencies is involved. This is a very difficult process, and if a wrong formant frequency is picked for use for comparison purposes, an erroneous result can occur.

Figure 1A:
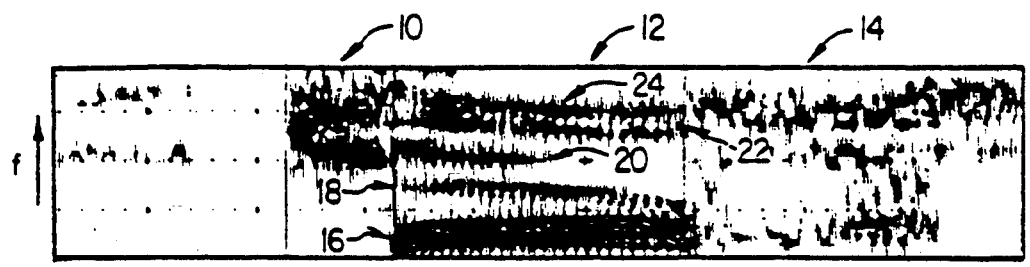
FIGS. 1a-e are spectrograms of five different verbal renditions of the word "chaff"
Figure 1B:
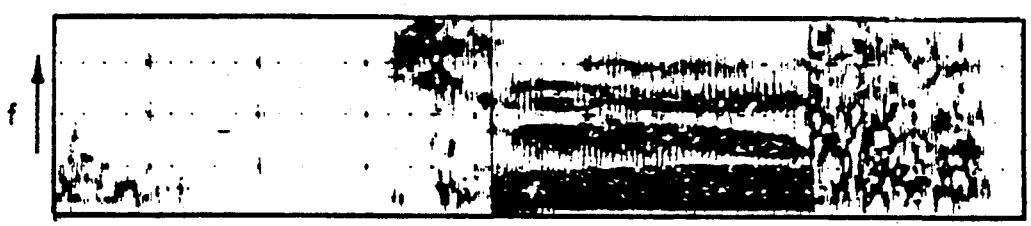
Figure 1C:
Figure 1D:
Figure 1E:
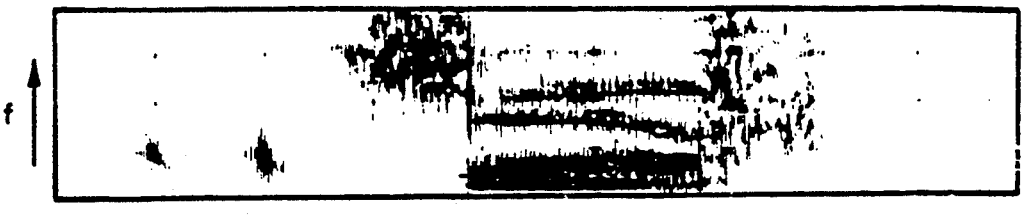

Referring to FIG. 1a, for example, it will be noted that in portion 12 as many as five possible formant frequencies may be determined. For example, the portions of the graph identified by arrows 16, 18, 20, 22, 24 represent generally horizontal extensions of frequencies which might be determined to be a modal or formant frequency. It is very difficult to make an absolute determination of which of the five modal frequencies 16, 18, 20, 22, 24 are the three primary formant frequencies. Such determination will be required to be made on each of the spectrograms shown in FIGS. 1a–e, and the decision and result may be different for each spectrogram. It is the purpose of the present invention to enable such determination to be made with a high degree of reliability.

Figure 2:
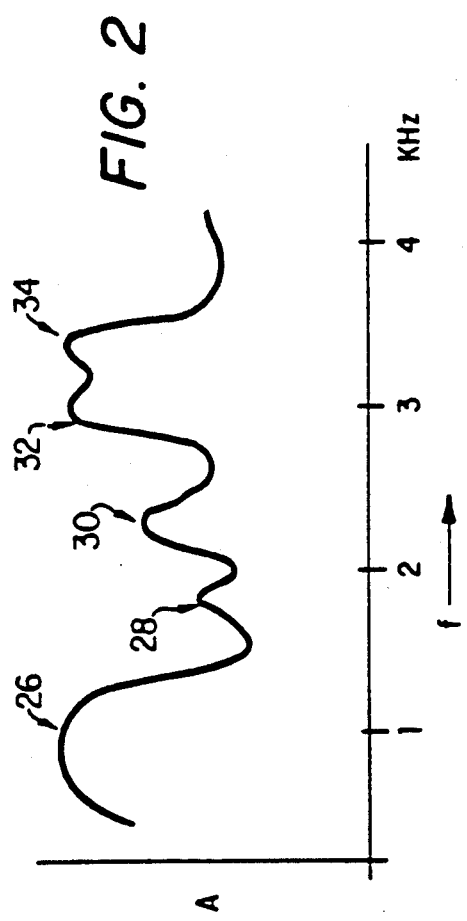
FIG. 2 is a graph of the amplitude versus frequency of a portion of the spectrogram shown in FIG. 1A.

FIG. 2 is a graph of the amplitude versus frequency of a section of the spectrogram shown in FIG. 1a. It will thus be noted that the graph shown in FIG. 2 has five distinct peaks, each of the peaks corresponding to one of the possible formant frequencies shown in FIG. 1a. For example, peak 26 corresponds to the graph area 16, peak 28 corresponds to graph area 18, peak 30 corresponds to graph area 20, etc. FIG. 2 illustrates the difficulty in determining the three primary formant frequencies for use in voice recognition.

The present invention does not attempt to determine the primary formant frequencies in an absolute sense, but the formant frequencies are determined in the context of a recognition hypothesis to be tested. First, a set of formant frequency candidates is determined independent of recognition hypotheses. The candidates thus include all possible choices of formants and, in the case of FIG. 2, would include all five of the formant frequency candidates 26, 28, 30, 32, 34. For each defined frame of reference data, the optimum choice of formant frequency candidates is determined which best matches the formant of the reference frame. Once the proper formant frequency candidates are determined for each frame, standard time alignment and decision-making techniques are then invoked to consummate the voice recognition.

Figure 3:
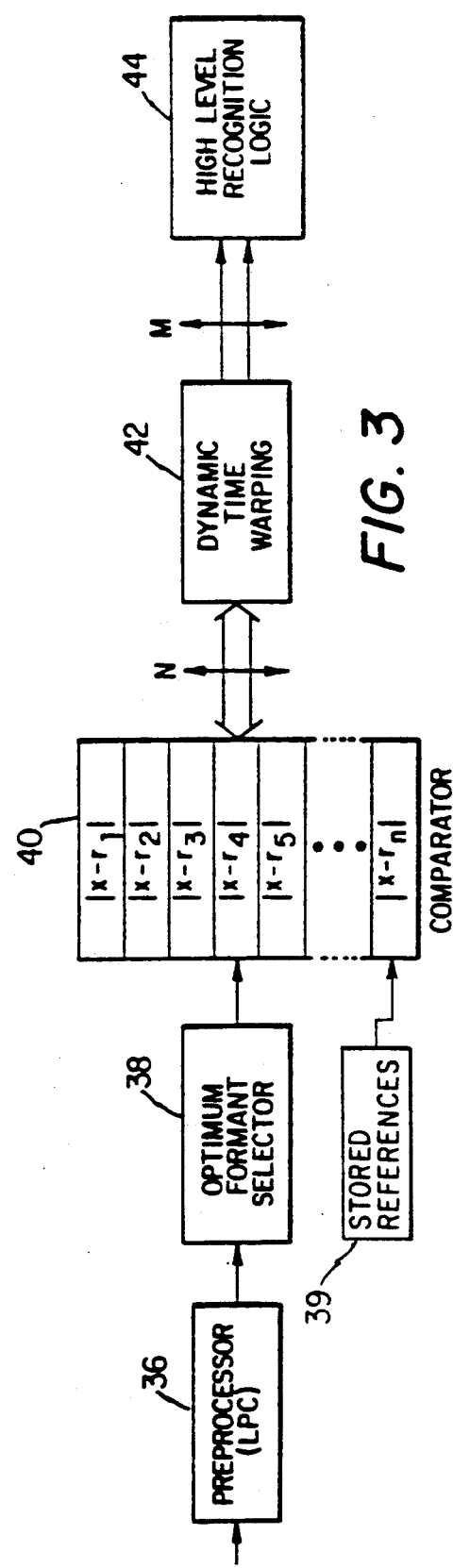
FIG. 3 is a block diagram of a preferred embodiment of the apparatus utilizing the present invention for speech recognition.

FIG. 3 illustrates a system for utilizing formant frequencies in speech recognition in accordance with the present invention. A speech signal designated as ST is applied to a pre-processor 36. It will be understood that the speech signal ST is in the form of a sequence of frames, each frame having a predetermined period, such as a duration of 20 or 30 milliseconds. The data within each frame will be analyzed by the present invention for use in comparison with reference data which has been previously input by enrollment and stored in the system in the conventional manner.

For further description of conventional enrollment and storage of reference data, reference is made to the copending patent application Ser. No. 461,884, filed Jan. 28, 1983, abandoned in favor of continuation application Ser. No. 013,154, filed Feb. 10, 1987 abandoned in favor of continuation application Ser. No. 110,062, filed Oct. 13, 1987, now U.S. Pat. No. 4,831,551 issued May 16, 1989 and is herein incorporated by reference. For example, the present system might be utilized to recognize a 10-word vocabulary. The 10 words would be audibly recorded, processed and stored in the present system for comparison with processed input speech signals in accordance with the present invention. The pre-processor 36 in the preferred embodiment will utilize the complex roots of a linear predictive coding polynomial as the formant frequency candidates. All of the complex roots, which form the set of possible formant frequency candidates for each frame, are then applied from the pre-processor 36 to the optimum formant selector 38.

In the preferred embodiment, the formants are represented in terms of mel frequency and log bandwidth. The log pitch frequency is also used as a feature in the determination by selector 38 of the optimum choice of formant frequency candidates. The resulting data from selector 38 are applied to a comparator 40 which compares the data with the previously stored voice reference data 59. The comparator 40 operates in an iterative process with selector 38 to select from the candidates those formants which most likely represent the stored reference formants. The outputs from the comparator 40 are applied to a dynamic time warping system 42 which operates to determine the minimum errors between reference vectors and input signal vectors to determine the lowest error cumulative path. The optimaly aligned vector hypothesis from the dynamic time warping system 42 is applied to a high level recognition logic 44 which operates by utilizing conventional time alignment and decision-making techniques to determine whether or not to declare a word as being recognized. Additional description of system 42 and recognition logic 44 may be found in the previously noted copending patent application Ser. No. 461,884, filed Jan. 28, 1983, abandoned in favor of continuation application Ser. No. 013,154, filed Feb. 10, 1987 abandoned in favor of continuation application Ser. No. 110,062, filed Oct. 13, 1987, now U.S. Pat. No. 4,831,551 issued May 16, 1989.

Referring to the pre-processor 36 in more detail, a linear predictive coding (LPC) polynomial is performed by the pre-processor 36. This LPC polynomial algorithm models human speech as the output of a time-varying recursive N pole filter with periodic or random inputs and essentially operates as a filter with N poles. In the preferred embodiment, the polynomial is then factored using a modified Bairstow root-finding procedure which assumes that the polynomial represents a linear predictive model of a speech signal with most of the roots being complex conjugate pairs lying close to the unit circle. The resulting complex conjugate poles are then transformed into frequencies and bandwidths to represent the forms of all possible formant frequencies for the particular voice signal frame. In the case of the signal shown in FIG. 2, for example, all five of the formant frequencies 26-34 will be presented to the optimum formant selector 38.

The LPC operation provided by the pre-processor 36 may be performed by a properly programmed digital processor and may use, for example, a similar system as described in copending patent application Ser. No. 461,884, filed Jan. 28, 1983, abandoned in favor of continuation application Ser. No. 013,154, filed Feb. 10, 1987, abandoned in favor of continuation application Ser. No. 110,062, filed Oct. 13, 1987, now U.S. Pat. No. 4,831,551 issued May 16, 1989. A program which has been found to work well in practice for the preprocessor 36 is defined below in Fortran programming language.

The optimum formant selector 38, in conjunction with the comparator 40, must select from the formant frequency candidates those formants which best match or are most likely to represent the reference formants. This is an iterative process. For example, with reference to FIG. 2, the first three formant frequency candidates 26, 28 and 30 might be considered, followed by formant frequency candidates 26, 28 and 32, followed by formant candidates 26, 28 and 34, etc. The iterative process is repeated until all reasonable combinations of three formant frequency candidates are considered in accordance with the process. For each of the chosen combinations of three formant frequencies, the distance between the input vectors and the reference vectors is determined and the shortest distance is determined. Alternatively, a linear transformation could be performed on the delta vector to provide the most likely formant frequency. The consideration process is represented in the comparator 40 by multiple combinations of distance computations /x-r$_1$/ to /x-r$_n$/ as illustrated in FIG. 3.

The comparator 40 compares the input data with reference data in the frame. Each frame produces N distance measurements by the comparator 40, or 50N distance measurements per second in the preferred embodiment, which utilizes 8,000 samples per second in the initial speech input signal. The output of the dynamic time warping provides N errors corresponding to M words in the stored vocabulary.

In the preferred embodiment, for each frame of reference data, the formant frequencies are noted in terms of mel frequency and log bandwidth. In addition, the log pitch frequency is also added as a determinative feature. This data is modeled as a multi-variate Gaussian random variable. Covariance matrix estimated for each reference frame from training tokens is then used in computing the likelihood of function.

The selection and comparison of the present invention may be advantageously accomplished by the following program set forth in Fortran upon a suitable digital processor.

This subroutine speeds up the mapping by limiting the range of frequencies searched. The method is to bracket the reasonable input formant candidates by limiting the maximum difference between input and reference mel frequency (thus roughly limiting the ratio between input and reference frequency). This subroutine maps the reference formants onto the input formants. The appropriately mapped input data are then output, and the optimum mapping error used to map the formants is returned. This mapping is accomplished by examining all possible correspondences and choosing that one which maximizes the likelihood of the data. The likelihood function is computed using the pooled formant covariance matrix determined from the formant-based vowel recognition experiments. The subroutine is set out below:

With the use of the present technique with reference to FIG. 2, for example, it may be determined that the correct formant frequency comprises frequencies 26, 28 and 32 as the three primary formant frequencies. These three primary formant frequencies may be utilized in the dynamic time warping system 42 and the high level recognition logic system 44 to compare against reference data to provide very accurate voice recognition.

The output of the dynamic time warping system 42 comprises the optimally aligned vector hypotheses which will be used by the high level recognition 44 to determine whether or not the hypothesis is good enough to declare recognition of a particular word. With the use of the present invention and with respect to FIGS. 1-2, the high level recognition logic 44 would determined the word "chaff" to have been uttered as represented by signal ST and shown in FIG. 1a.

Background on LPC analysis generally and on various methods for extraction of LPC parameters is found in numerous generally known references including Markel and Gray, *Linear Prediction of Speech*, (1976) and Rabiner and Schafer, *Digital Processing of Speech Signals*, (1978) and references cited therein, all of which are herein incorporated by reference. While the present invention may be embodied and operated by the use of a number of commercially available digital processors, it will also be understood that a technique may be implemented in hardware.

It will thus be seen that the present invention provides a technique for very accurately determining formant frequencies for use in speech recognition with extremely high reliability. The technique generates all possible formant frequency candidates for each frame with the speech signals and selects optimum formant frequencies for each frame in accordance with predeter-

```
         subroutine  FMTMAP4   (PCH_IN,    MEL_IN,    LBW_IN,
NCAND,
      1                        PCH_REF,   MEL_REF,   LBW_REF,
MFMT, I_OUT, N_REF)
```

This subroutine includes the log of the pitch period as an element in the feature vector used to determine optimum formant mapping. This subroutine takes its input in mel frequencies and bandwidths rather than in quadratic factors, and provides mapping outputs in terms of indices of formant candidates rather than in an explicit set of ordered quadratic factors. Provision is made for distance normalization specific to each reference frame. An initialization entry point is provided so that the covariance matrices for each reference frame can be preloaded.

mined reference criteria. The present invention requires a large number of measurements under a large number of hypotheses and, therefore, requires additional operations and pre-developed techniques. However, cluster analysis can be utilized to reduce the number of calculations required. The larger the number of frames utilized in the operation of the invention, the greater the reduction possibilities.

Although the present embodiment of the invention has been described in detail, it should be understood that various changes, alterations and substitutions can be made therein without departing from the spirit and scope of the invention as defined by the appended claims.

What is claimed is:

1. A method for recognizing speech signals organized into a sequence of frames, said method comprising:

storing a plurality of reference frames of formant frequencies representative of linguistic units providing a vocabulary of words;

generating a plurality of format frequency candidates for each frame of the speech signals desired to be recognized;

creating a plurality of all possible subsets of optimum formant frequencies for each frame based upon the plurality of formant frequency candidates generated for the respective frame, wherein each subset comprises some but not all of the formant frequency candidates generated for that frame;

comparing each subset of the plurality of all possible subsets of optimum formant frequencies for each frame of the speech signals to be recognized with each of the plurality of reference frames of formant frequencies;

selecting one subset from said plurality of all possible subsets of optimum formant frequencies for each frame from said formant frequency candidates which best matches the stored formant frequencies of a corresponding reference frame of formant frequencies in accordance with predetermined criteria; and recognizing said speech signals in response to the selected one subset of optimum formant frequencies for respective frames.

2. The method of claim 1 wherein said step of generating a plurality of formant frequency candidates for each frame of the speech signals to be recognized utilizes linear predictive coding to generate said formant frequency candidates for the respective frame.

3. The method of claim 2 wherein said step of generating a plurality of formant frequency candidates for each frame of the speech signals to be recognized further includes:

factoring the output of said linear predictive coding with a Bairstow algorithm to provide roots indicative of respective formant frequency candidates for each respective frame.

4. The method of claim 1 wherein said step of selecting utilizes the pitch frequency of the speech signals as an aspect of said predetermined criteria.

5. The method of claim 1 wherein said step of selecting comprises:

generating representations of said formant frequency candidates as mel frequency and log bandwidth; and modeling said representations as multivariate Gaussian random variables.

6. The method of claim 5 wherein said step of recognizing said speech signals further includes:

computing a likelihood function of the best match of a selected subset of optimum formant frequencies for a respective frame with a corresponding reference frame of formant frequencies utilizing a covariance matrix being correct speech signal recognition.

7. A method for recognizing speech signals organized into a sequence of frames, said method comprising:

storing a plurality of reference frames of formant frequencies representative of linguistic units providing a vocabulary of words in which each reference frame contains a predetermined number of primary formant frequencies;

generating a plurality of format frequency candidates for each frame of the speech signals desired to be recognized;

grouping the formant frequency candidates for each frame into all possible combinations of subsets thereof having the same predetermined number of formant frequencies of each of the plurality of reference frames, wherein each subset comprises some but not all of the formant frequency candidates generated for that frame;

comparing each of the possible combinations of subsets of formant frequency candidates for each frame of the speech signals to be recognized with the formant frequencies contained in each of the plurality of reference frames;

selecting one subset of all possible subsets of optimum formant frequencies for each frame from said formant frequency candidates for the respective frame which best matches the stored formant frequencies of a respective reference frame in accordance with predetermined criteria; and recognizing said speech signals in response to the selected optimum formant frequencies comprising the selected subset of formant frequencies for each respective frame.

* * * * *